J. SPOHR.
FRONT AXLE BRACE.
APPLICATION FILED JAN. 29, 1920.
1,342,514. Patented June 8, 1920.
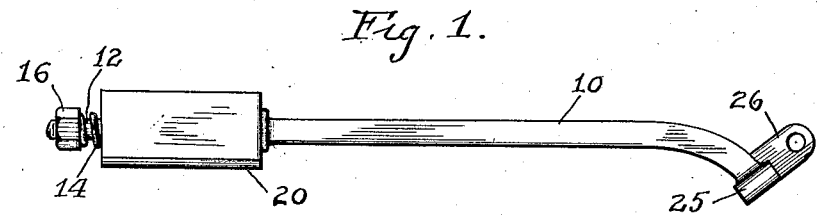
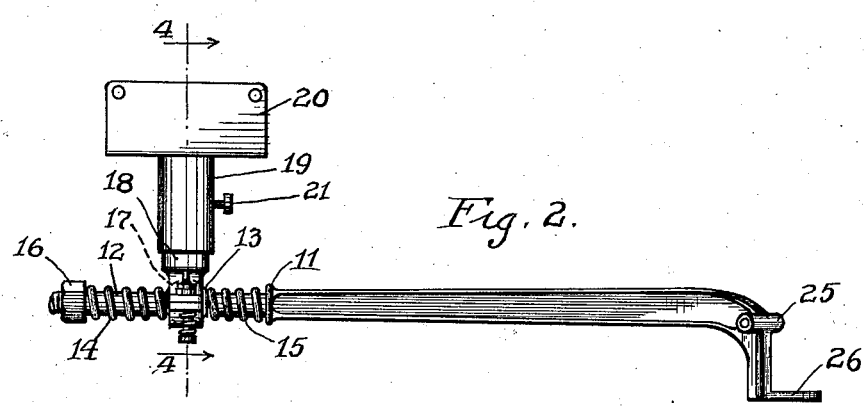
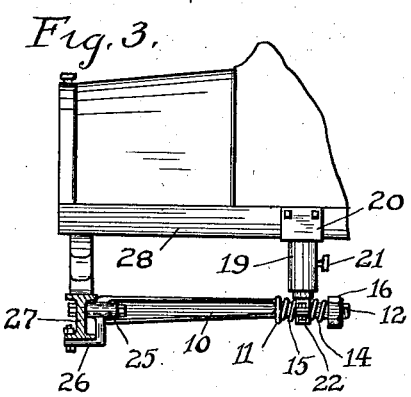
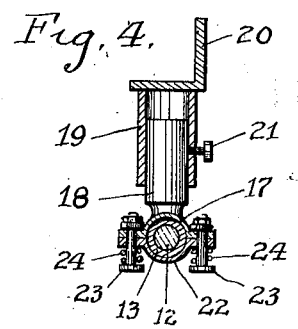
INVENTOR.
JOHN SPOHR
BY Albert C. Bee
ATTORNEY.

UNITED STATES PATENT OFFICE.

JOHN SPOHR, OF CHICAGO, ILLINOIS, ASSIGNOR TO HOWARD R. BRUAH, OF CHICAGO, ILLINOIS.

FRONT-AXLE BRACE.

1,342,514. Specification of Letters Patent. Patented June 8, 1920.

Application filed January 29, 1920. Serial No. 354,895.

*To all whom it may concern:*

Be it known that I, JOHN SPOHR, a citizen of the United States, residing at Chicago, in the county of Cook and State of Illinois, have invented a new and useful Improvement in Front-Axle Braces, of which the following is a specification.

My invention relates to an improved form of front axle brace adapted for use particularly in connection with motor vehicles. With certain types of motor vehicles where a cross spring is used to support the frame of the vehicle from the front axle, braces are employed extending rearwardly from the front axle to the body of the vehicle. In connection with braces of this kind difficulties have arisen in the past either from connecting the braces to the transmission cases or from constructing the brace in such a manner that the connections are rigid and as a result the connecting devices are loosened when the brace is in use. By my invention I provide a construction which is readily adaptable to different dimensions between the frame and the front axle and by which resilient devices are provided in the connection between the axle and the frame of the vehicle so that the shocks are not communicated to the frame and furthermore my device consists of a plurality of parts which may readily be moved in practically any direction to secure a proper relation of the parts and a proper operation of the parts after they are secured in place.

My invention will best be understood by reference to the accompanying drawings showing a preferred form thereof, in which—

Figure 1 shows the brace and its connected parts in top view,

Fig. 2 is a side elevation of the parts shown in Fig. 1,

Fig. 3 is a side elevation to a reduced scale of a brace and its connected parts in place on the front end of a motor vehicle and Fig 4 is a vertical sectional view of the parts shown in Fig. 2 taken along the line 4—4.

Similar numerals refer to similar parts throughout the several views.

As shown in Figs. 1 and 2 my brace 10 consists preferably of a casting or forging of suitable material such as iron or steel having near one end a shoulder 11 from which a cylindrical portion 12 projects through a ball 13 used to secure the brace to the fastening devices connected with the frame of the vehicle. The cylindrical portion 12 carries on either side of the ball 13 springs 14 and 15 which are held in place by a nut 16 secured to the end of said cylindrical portion. The ball 13 is a sliding fit on the portion 12 as a result of which any shocks communicated to the brace are cushioned by the springs 14 and 15. The ball 13 is contained in a socket 17 carried by the lower end of a stud 18 which is of cylindrical conformation and is a sliding fit in the tubular member or extension 19 formed on the bracket 20 formed to be secured to the side frame member of the vehicle. A clamping device in the form of a set screw 21 is provided to hold the stud 18 in any desired position in the tubular extension 19. A cap 22 is secured to the socket 17 to inclose the ball 13 by bolts 23 between the heads of which and the cap 22, springs 24 are located to cushion shocks that may be communicated to the ball by movement of the brace 10. The brace 10 has formed on its other end a boss 25 and a flange 26 for engaging the front axle 27 of the vehicle in the manner indicated in Fig. 3 in which view the brace 10 is shown secured to said axle by means of suitable bolts. In this view the bracket 20 is shown as secured to the side frame member 28 by suitable bolts.

It will be understood in connection with motor vehicles of the kind under consideration that there is a difference in different vehicles in the dimension between the top of the axle 27 and the bottom of the frame member 28 as a result of which these brace constructions cannot be made with a fixed dimension without subjecting the brace and connected parts to strain when it is attached to some of these vehicles. By my invention I obviate this difficulty by providing the tubular extension 19 to receive the stud 18 so that by releasing the fastening device 21 the stud may readily be moved to the position required by the particular said dimension found in the vehicle to which the brace is to be attached. In addition to this the ball and socket connection provides a means for readily compensating for any slight irregularity of dimensions in other directions. It will be understood that one of these brace constructions is employed on each end of the axle so that the axle as a whole is held in proper position by the braces.

From the construction above described it will appear that I have provided a device by which the front axle of a motor vehicle may be braced without placing any strains on the brace construction in putting it in place on the vehicle and furthermore that by my construction the strains or shocks exerted upon the axle in use, are communicated directly to the side members of the frame of the vehicle and furthermore that all said strains and shocks are cushioned by the construction described before they are exerted upon the said frame. Furthermore the ball and socket construction described provides that the front axle may move freely in a vertical direction to accommodate itself to differences in load and inequalities in the road bed without producing any strain on the brace construction and its connected parts.

While I have shown my invention in the particular embodiment above described I do not however limit myself to this exact construction as I may employ equivalents thereof known to the art at the time of the filing of this application without departing from the scope of the appended claims.

What I claim is:

1. In a device of the class described, the combination of an axle, a frame member, a brace secured at one end of said axle, a stud pivotally connected to the other end of said brace, and a bracket attached to said frame member, said bracket having a tubular extension for adjustably receiving said stud, and means for securing said stud in any desired position in said extension.

2. In a device of the class described, the combination of an axle, a frame member, a brace secured at one end to said axle, a stud pivotally connected to the other end of said brace, and a bracket attached to said frame member, said bracket having a tubular extension for adjustably receiving said stud, means for securing said stud in any desired position in said extension, and springs between said pivotal connection and said brace.

3. In a device of the class described, the combination of an axle, a frame member, a brace secured at one end to said axle, a stud pivotally connected to the other end of said brace, and a bracket attached to said frame member, said bracket having a tubular extension for adjustably receiving said stud, and means for securing said stud in any desired position in said extension, said pivotal connection comprising a ball carried by said brace and a socket engaging said ball and carried by said stud.

4. In a device of the class described, the combination of an axle, a frame member, a brace secured at one end to said axle, a stud pivotally connected to the other end of said brace, and a bracket attached to said frame member, said bracket having a tubular extension for adjustably receiving said stud, means for securing said stud in any desired position in said extension, said pivotal connection comprising a ball carried by said brace and a socket engaging said ball and carried by said stud, and springs between said pivotal connection and said brace.

5. In a device of the class described, the combination of a brace, a stud pivotally connected to said brace, a bracket having a tubular extension for adjustably receiving said stud, and means for securing said stud in desired position in said tubular extension.

6. In a device of the class described, the combination of a brace, a stud pivotally connected to said brace, a bracket having a tubular extension for adjustably receiving said stud, means for securing said stud in desired position in said tubular extension, and springs between said pivotal connection and said brace.

7. In a device of the class described, the combination of a brace, a stud pivotally connected to said brace, a bracket having a tubular extension for adjustably receiving said stud, and means for securing said stud in desired position in said tubular extension, said pivotal connection comprising a ball carried by said brace and a socket engaging said ball and carried by said stud.

8. In a device of the class described, the combination of a brace, a stud pivotally connected to said brace, a bracket having a tubular extension for adjustably receiving said stud, means for securing said stud in desired position in said tubular extension, said pivotal connection comprising a ball carried by said brace and a socket engaging said ball and carried by said stud, and springs between said pivotal connection and said brace.

In witness whereof, I hereunto subscribe my name this 26th day of January, A. D. 1920.

JOHN SPOHR.